United States Patent
Manevich et al.

(10) Patent No.: US 11,544,249 B2
(45) Date of Patent: Jan. 3, 2023

(54) REDUCING SIGNATURE VERIFICATIONS OF DATABASE ENTRIES

(71) Applicant: International Business Machines Corporation, Armonk, NY (US)

(72) Inventors: Yacov Manevich, Haifa (IL); Artem Barger, Haifa (IL); Alessandro Sorniotti, Rueschlikon (CH); Angelo De Caro, Zürich (CH); Elli Androulaki, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 16/201,402

(22) Filed: Nov. 27, 2018

(65) Prior Publication Data

US 2020/0167339 A1    May 28, 2020

(51) Int. Cl.
G06F 16/23    (2019.01)
H04L 9/06     (2006.01)
H04L 9/00     (2022.01)

(52) U.S. Cl.
CPC ........ *G06F 16/2379* (2019.01); *H04L 9/0637* (2013.01); *H04L 9/0643* (2013.01); *H04L 9/50* (2022.05)

(58) Field of Classification Search
CPC . G06F 16/2379; H04L 9/0637; H04L 9/0643; H04L 2209/38
USPC ........................................................ 707/703
See application file for complete search history.

(56) References Cited

U.S. PATENT DOCUMENTS

| | | | |
|---|---|---|---|
| 9,853,819 B2 | 12/2017 | Truu et al. | |
| 2017/0031676 A1* | 2/2017 | Cecchetti | H04L 9/3236 |
| 2017/0132626 A1 | 5/2017 | Kennedy | |
| 2017/0180134 A1 | 6/2017 | King | |
| 2017/0213209 A1 | 7/2017 | Dillenberger | |

(Continued)

FOREIGN PATENT DOCUMENTS

WO    2018089843 A1    5/2018

OTHER PUBLICATIONS

Ethan Cecchetti, Fan Zhang, Yan Ji, Ahmed Kosba, Ari Juels, and Elaine Shi, "Solidus: Confidential Distributed Ledger Transactions via PVORM," CCS '17 Proceedings of the 2017 ACM SIGSAC Conference on Computer and Communications Security, pp. 701-717.

(Continued)

*Primary Examiner* — Hosain T Alam
*Assistant Examiner* — Saba Ahmed

(57) ABSTRACT

An example operation may include one or more of identifying a new entry, receiving one or more new entry signatures to approve the new entry to, such that the one or more new entry signatures each include a signature of the new entry and hashes of previously signed entries for a common block, verifying the one or more new entry signatures for commit by performing a signature verification of the new entry, determining the common block has more than one entry with a hash signed by a same member, and responsive to the signature check being performed on the new entry and determining the common block has more than one entry with a hash signed by a same member, designating one or more previously received entries as verified for commit without performing a signature verification of the one or more previously received entries.

17 Claims, 16 Drawing Sheets

(56) References Cited

U.S. PATENT DOCUMENTS

| 2018/0082256 | A1  | 3/2018  | Tummuru et al. | |
| 2018/0264347 | A1* | 9/2018  | Tran | A63B 71/145 |
| 2018/0337772 | A1* | 11/2018 | Acar | H04L 63/123 |
| 2019/0026146 | A1* | 1/2019  | Peffers | G06F 9/5044 |

OTHER PUBLICATIONS

Jan Camenisch, Manu Drijvers, and Maria Dubovitskaya, "Practical UC-Secure Delegatable Credentials with Attributes and Their Application to Blockchain," CCS '17 Proceedings of the 2017 ACM SIGSAC Conference on Computer and Communications Security, pp. 683-699.

Thomas Dickerson, Paul Gazzillo, Maurice Herlihy, and Eric Koskinen, "Adding Concurrency to Smart Contracts," PODC '17 Proceedings of the ACM Symposium on Principles of Distributed Computing, pp. 303-312.

* cited by examiner

100

| ENDORSERS 104 | TRANSACTIONS 102 | | | | |
|---|---|---|---|---|---|
| | $Tx_m$ | $Tx_{m+1}$ | $Tx_{m+2}$ | $Tx_{m+3}$ | $Tx_n$ |
| PEER0 | $Tx_m$ | | $Tx_{m+2}, H(Tx_m)$ | | $Tx_{m+2}, H(Tx_m)Tx_n$ |
| PEER1 | | $Tx_{m+1}$ | | $Tx_{m+3}, H(Tx_{m+1})$ | |
| PEER2 | $Tx_m$ | | $Tx_{m+2}, H(Tx_m)$ | | $Tx_{m+2}, H(Tx_m)Tx_n$ |
| PEER3 | | $Tx_{m+1}$ | | $Tx_{m+3}, H(Tx_{m+1})$ | |

| TRANSACTIONS 102 | ENDORSERS 104 | NUMBER OF SIGNATURES 106 |
|---|---|---|
| $Tx_m$ | PEER0, PEER2 | 2 |
| $Tx_{m+1}$ | PEER1, PEER3 | 2 |
| $Tx_{m+2}$ | PEER0, PEER2 | 2 |
| $Tx_{m+3}$ | PEER1, PEER3 | 2 |
| $Tx_n$ | PEER0, PEER2 | 2 |

ENDORSEMENT WITH PAYLOAD AND OTHER HASHES OF OTHER TXS

| TRANSACTIONS IN BLOCK (B) ENDORSED BY PEER Ej ||
|---|---|
| PAYLOAD 112 | SIGNATURE 114 |
| $Tx_0$ | $\sigma(H(Tx_0))$ |
| $Tx_1, H(Tx_0)$ | $\sigma(H(Tx_1\|H(Tx_1)))$ |
| $Tx_2, H(Tx_0), H(Tx_1)$ | $\sigma(H(Tx_2\|H(Tx_0)\|H(Tx_1)))$ |
| $Tx_5, H(Tx_2), H(Tx_3), H(Tx_4)$ | $\sigma(H(Tx_5\|H(Tx_2)\|H(Tx_3)\|H(Tx_4)))$ |
| $Tx_3, H(Tx_1), H(Tx_2)$ | $\sigma(H(Tx_3\|H(Tx_1)\|H(Tx_2)))$ |

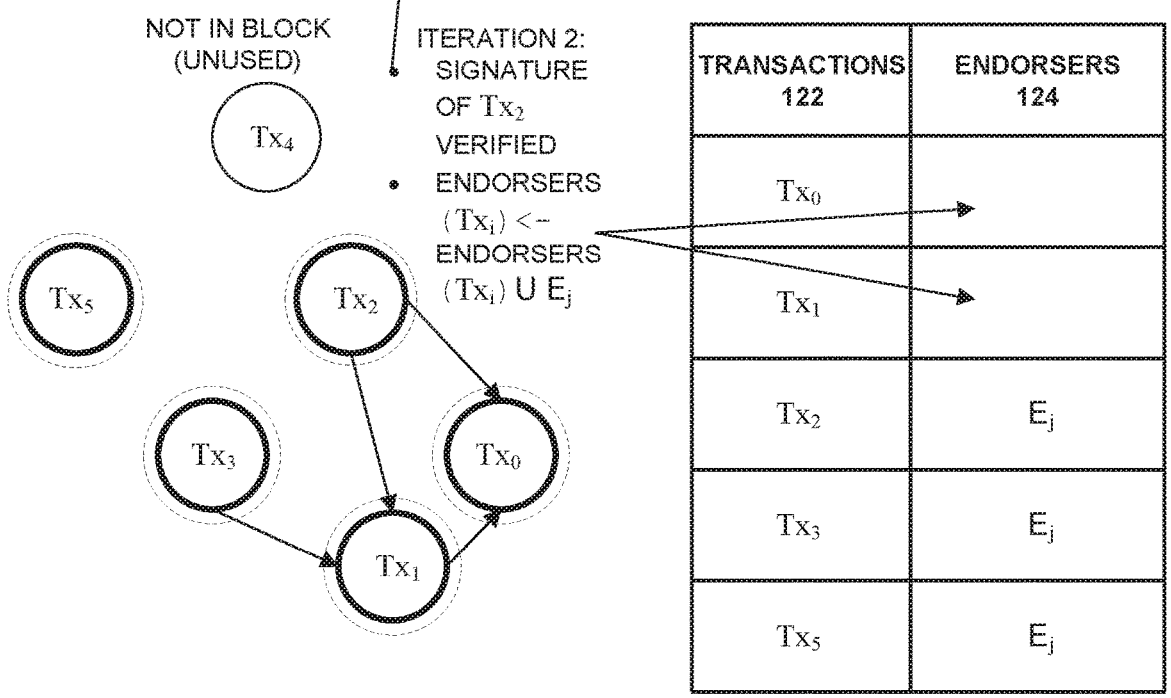

NOT IN BLOCK (UNUSED)

ITERATION 2:
SIGNATURE OF $Tx_2$ VERIFIED
• ENDORSERS $(Tx_i) \leftarrow$ ENDORSERS $(Tx_i) \cup E_j$

| TRANSACTIONS 122 | ENDORSERS 124 |
|---|---|
| $Tx_0$ | |
| $Tx_1$ | |
| $Tx_2$ | $E_j$ |
| $Tx_3$ | $E_j$ |
| $Tx_5$ | $E_j$ |

| TRANSACTIONS IN BLOCK (B) ENDORSED BY PEER Ej ||
|---|---|
| PAYLOAD 112 | SIGNATURE 114 |
| $Tx_0$ | $\sigma(H(Tx_0))$ |
| $Tx_1, H(Tx_0)$ | $\sigma(H(Tx_1\|H(Tx_1)))$ |
| $Tx_2, H(Tx_0), H(Tx_1)$ | $\sigma(H(Tx_2\|H(Tx_0)\|H(Tx_1)))$ |
| $Tx_5, H(Tx_2), H(Tx_3), H(Tx_4)$ | $\sigma(H(Tx_5\|H(Tx_2)\|H(Tx_3)\|H(Tx_4)))$ |
| $Tx_3, H(Tx_1), H(Tx_2)$ | $\sigma(H(Tx_3\|H(Tx_1)\|H(Tx_2)))$ |

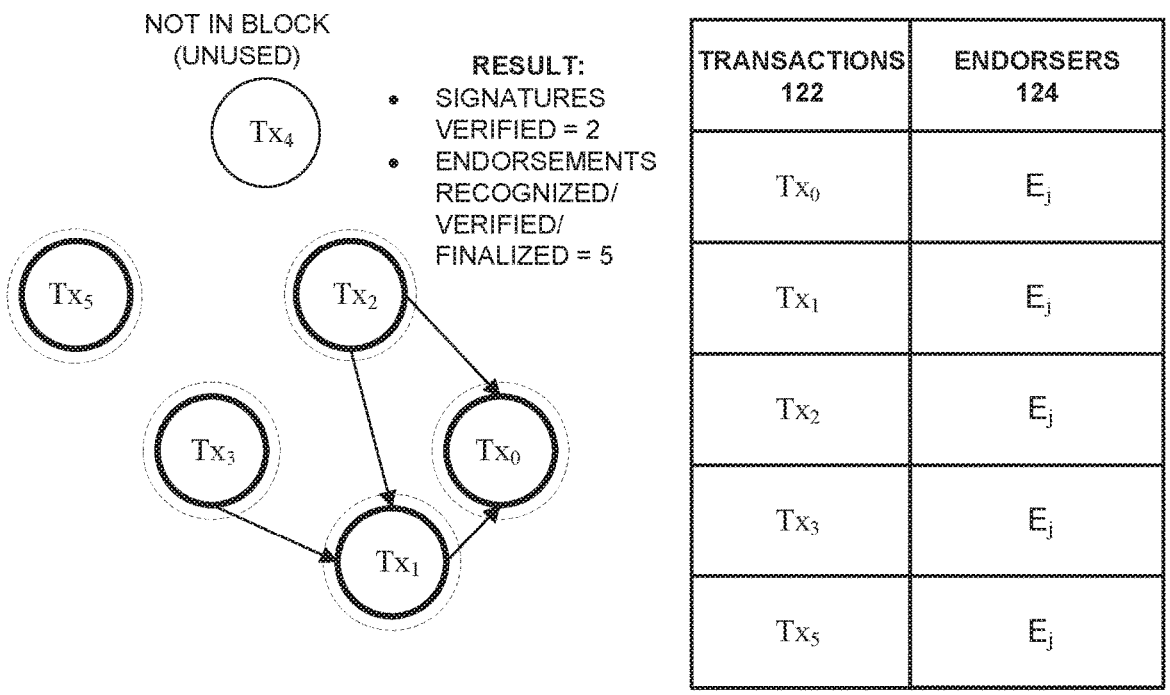

NOT IN BLOCK (UNUSED)

RESULT:
- SIGNATURES VERIFIED = 2
- ENDORSEMENTS RECOGNIZED/ VERIFIED/ FINALIZED = 5

| TRANSACTIONS 122 | ENDORSERS 124 |
|---|---|
| $Tx_0$ | $E_j$ |
| $Tx_1$ | $E_j$ |
| $Tx_2$ | $E_j$ |
| $Tx_3$ | $E_j$ |
| $Tx_5$ | $E_j$ |

DATA BLOCK 750

REDUCING SIGNATURE VERIFICATIONS OF DATABASE ENTRIES

TECHNICAL FIELD

This application generally relates to verification management, and more particularly, reducing signature verifications of database entries.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database must perform many signature verifications for new entries which are encrypted and received with signatures of authorized parties. As such, what is needed is a solution to overcome these significant drawbacks.

SUMMARY

One example embodiment may provide a system that includes a computing node configured to perform one or more of identify a new entry, receive one or more new entry signatures to approve the new entry, wherein the one or more new entry signatures each comprise a signatures of the new entry and hashes of previously signed entries for a common block, verify the one or more new entry signatures for commit by a signature verification of the new entry, determine the common block has more than one entry with a hash signed by a same member, and responsive to the signature verification being performed on the new entry and the common block being identified as having more than one entry with a hash signed by a same member, designate one or more previously received entries as verified for commit without a signature verification being performed on the one or more previously received entries.

Another example embodiment includes a method that includes one or more of identifying a new entry, receiving one or more new entry signatures to approve the new entry to, such that the one or more new entry signatures each include a signature of the new entry and hashes of previously signed entries for a common block, verifying the one or more new entry signatures for commit by performing a signature verification of the new entry, determining the common block has more than one entry with a hash signed by a same member, and responsive to the signature check being performed on the new entry and determining the common block has more than one entry with a hash signed by a same member, designating one or more previously received entries as verified for commit without performing a signature verification of the one or more previously received entries.

Yet another example embodiment includes a non-transitory computer readable storage medium configured to store instructions that when executed cause a processor to perform one or more of identifying a new entry, receiving one or more new entry signatures to approve the new entry, such that the one or more new entry signatures each include a signature of the new entry and hashes of previously signed entries for a common block, verifying the one or more new entry signatures for commit by performing a signature verification of the new entry, determining the common block has more than one entry with a hash signed by a same member, and responsive to the signature check being performed on the new entry and determining the common block has more than one entry with a hash signed by a same member, designating one or more previously received entries as verified for commit to without performing a signature verification of the one or more previously received entries.

BRIEF DESCRIPTION OF THE DRAWINGS

IG. 1A illustrates a diagram of a signature verification management configuration, according to example embodiments.

FIG. 1C illustrates another diagram of a signature verification management configuration where a reduced number of endorsement verifications are performed to verify a larger number of entries, according to example embodiments.

FIG. 1D illustrates another diagram of a signature verification management configuration where a reduced number of endorsement verifications are performed to verify a larger number of entries, according to example embodiments.

DETAILED DESCRIPTION

Figure 1B:
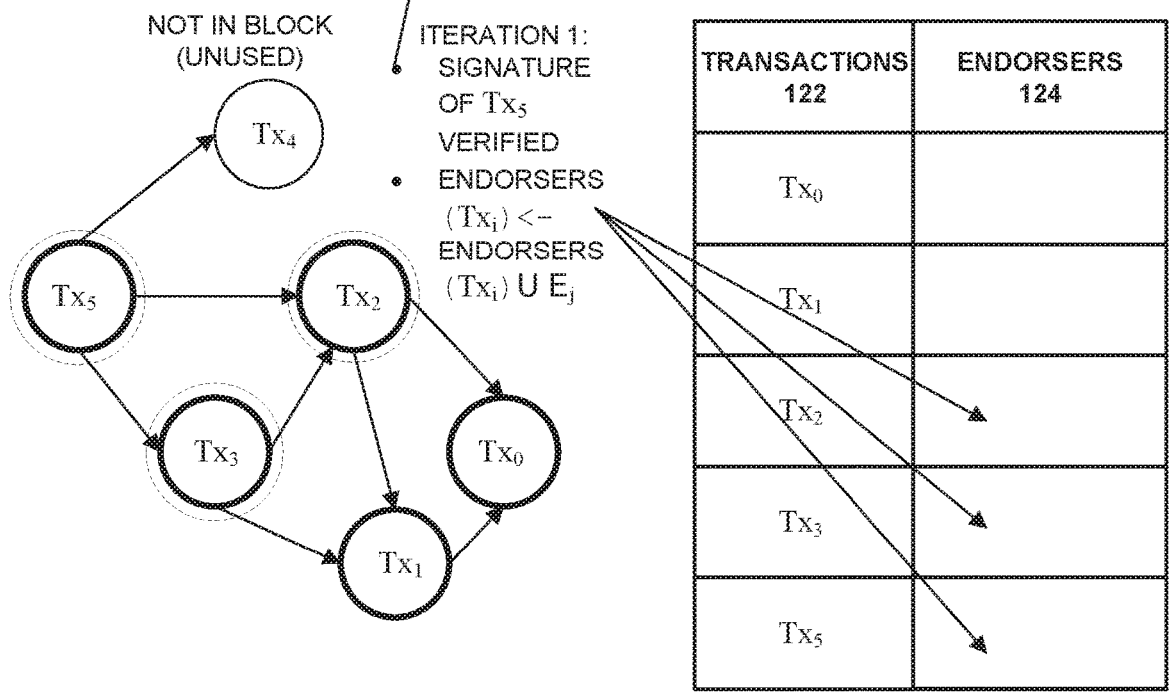
FIG. 1B illustrates another diagram of a signature verification management configuration, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide, for permissioned blockchain implementations, a mechanism to manage signature verifications. By applying a verification technique that reduces a number of verifications necessary when verifying various entries of a common block. The number of signature verifications that a block requires for validation purposes, based on entries signed by certain same signer members for the block, can be reduced, and verification measures can still be performed but without performing verifications for every signed entry received for an intended block.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain over the blocks. This process forms the ledger by ordering the storage entries, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. In some blockchains where transaction execution happens before its ordering, the transactions are simulated on a subgroup of peers. Such peers are called "endorsing peers" or "endorsers".

A ledger is a sequenced, tamper-resistant record of all state transitions of a blockchain. State transitions may result from smart contract invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

A blockchain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The blockchain may be stored on a peer node file system (i.e., local, attached storage, cloud, etc.), efficiently supporting the append-only nature of the blockchain workload.

The current state of the immutable ledger represents the latest values for all keys that are included in the blockchain entry log. Because the current state represents the latest key values known to the blockchain, it is sometimes referred to as a world state. Smart contract invocations execute entries against the current state data of the ledger. To make interactions efficient, the latest values of the keys may be stored in a state database. The state database may be simply an indexed view into the blockchain's entry log, it can therefore be regenerated from the blockchain at any time. The state database may automatically be recovered (or generated if needed) upon peer node startup, and before entries are accepted.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

FIG. 1A illustrates a diagram of a signature verification management configuration, according to example embodiments. Referring to FIG. 1A, the configuration 100 includes a table of endorsing peers 104, which may be certain peer members of the blockchain authorized to execute and sign transactions. The peers may endorse (sign) certain transaction entries ($T_x$) 102 and include in the payload of the endorsement, hash information (H) of other entries that they have endorsed previously. When the transaction/entries 102 are identified via a verification node, the identities of endorsers 104 and signatures 106 are identified to identify which endorsers have endorsed which entries. However, once an endorser is known to have endorsed certain entries, which may be confirmed from the hash information received, then the current entry can be verified via a signature check verification while other entries can also be designated as verified even though such other entries may not have had individual signature endorsement operations performed on those other entries. Instead, the other entries are just designated as verified since the same block has already included those entries in later transaction signatures from the same trusted endorsers. This may be performed on a block by block basis. A block may contain numerous transactions/entries. An entry may be a single blockchain transaction. An endorser may be a blockchain member that signs a transaction. A signature may be referred to synonymously with an endorsement.

According to example embodiments, transaction signers would each have a local cache of a fixed size of hashes of entries of which they have signed, and whenever an entry is signed, the signer includes in the signature's payload of the current entry, the hashes of the previous transactions that were signed, and whenever a new block arrives to the endorser, the cache is wiped out (i.e., erased) since the previous block is now completed. Such a technique can also be applied for clients, however, for example purposes, the technique is applied for endorsing peer signatures in a blockchain that simulates transactions and signs over the results of the execution before ordering the transactions, since a number of endorsing peers in the blockchain network is expected to be smaller than a number of clients, and thus the probability that a block will contain two signatures signed by the same signing entity is substantial. The result may be X entries are verified for commit to the blockchain by performing Y signature verifications of the endorsed entries, where X>Y.

According to example embodiment, if a block contains a set T={t0, . . . tk-1} of transactions/entries signed by the same entity (endorser), the node that validates the block, would only need to verify k'<k=|T| signatures instead of k, this may result in only a single signature verification performed that verifies transitively more than one transaction. This is done by having the entity that normally signs a cryptographic hash H(x) of the blockchain entry to sign the hashes of previous entries that were signed by that entity. In one example, let u be a user that signed a transaction $t_0$ via sending <σH($t_0$), $t_0$> to nodes that produce blocks where σ(x) is the signature of x that can be verified by u's public key. When u submits the next transaction $t_1$, instead of sending <H(σ($t_1$), $t_1$> to the nodes that produce blocks, it instead sends: <σ(H($t_1$∥H($t_0$))), ($t_1$, H($t_0$))>. In other words, when u submits transaction $t_i$, instead of sending <σ(H($t_i$)), $t_i$>, t instead sends: <σ(H($t_i$∥H($t_{i-1}$)∥($t_{i-2}$)∥ . . . ∥H($T_{i-r}$))), ($t_i$, H($t_{i-1}$), H($t_{i-2}$), . . . H($t_{i-r}$))> for some constant r∈ℕ that depends on the expected number of transactions of u that will be placed in the same block. The nodes that validate the blocks, can verify signatures over payloads that contain hashes of previous transactions signed by the same entity, and thus skip verifying signatures of hashes that are found in these payloads and designating those skipped entries as verified even though the signatures where not verified. In one example: after verifying σ(H($t_i$∥H($t_{i-1}$)∥H($t_{i-2}$)∥ . . . ∥H($t_{i-r}$)∥), there is no need to verify σ(H($t_{i-1}$)), σH($t_{i-2}$)), . . . σ(H($t_{i-r}$)), meaning r-1 signature verifications are saved. Ideally, signatures of transactions would be verified that are found later in the block, which also indirectly endorses transactions that are found earlier in the block, and thus minimizes signature checks since the payload that is in the current endorsement is the transaction itself with the hashes of a few (fixed size) previous transactions as evidence of other signatures.

In another example, the verification of signatures in a block can be performed by executing the following algorithm: For each transaction $tx_i$ in block B: denote endorsers ($tx_i$)=∅ to be the identities of endorsers that endorsed transaction $tx_i$ (initialized empty), denote $G_j$=($V_j$, $E_j$) an empty directed graph associated with endorser $E_j$ and vertices of endorsers for some endorser 'j' ($V_j$), for which a transaction exists in the block, let $S_1^i$, $S_2^i$, . . . $S_k^i$ be the signatures for $tx_i$, then for each endorsement $E_j^i$ of the endorser, let $E_j$ be the identity of the endorsing peer. Also, denote $S_j^i$=<σ(H($t_i$∥H($t_{i-1}$)∥H($t_{i-2}$)∥ . . . ∥H($t_{i-r}$)), ($t_i$, H($t_{i-1}$), H($t_{i-2}$), . . . H($t_{i-r}$)), $E_j$> and $V_j$=$V_j$∪{($S_j^i$, $S_{j-1}^i$, $S_{j-2}^i$, . . . $S_{j-r}^i$}, $E_j$=$E_j$∪{($S_j^i$, $S^{i-1}_j$), ($S_j^i$, $S^{i-2}_j$), ($S_j^i$, $S^{i-3}_j$), . . . , ($S_j^i$, $S^{i-r}_j$)}. For each $G_j$=($V_j$, $E_j$), let $P_j$ be a topical sort of $G_j$. If no such topological sort exists (i.e., the graph is cyclical), abort the algorithm, and perform block validation as defined originally in the system. For each $P_j$, iterate over $P_j$ that are not marked. Every vertex in $P_j$ is a transaction endorsed by $E_j$. Select the vertex $S^i_j$∈$P_j$ with the highest out-degree in $E_j$ connected to the most transactions. Verify the signature σ(H($t_i$∥H($t_{i-1}$)∥H($t_{i-2}$)∥ . . . ∥H($T_{i-r}$))) with $E_j$'s public key, if valid, mark vertices $S^i_j$, $S^{i-1}_j$, $S^{i-2}_j$, . . . $S^{i-r}_j$ as verified, remove from $E_j$ all edges from $S^i_j$ or $S^{i-j}_j$, $S^{i-2}_j$, . . . $S^{i-r}_j$ and set. Endorsers($tx_i$)=Endorsers($tx_i$)∪$E_j$. If the signature is invalid, delete the vertex $S^i_j$ and its edges from $G_j$. Endorsers ($tx_i$) contains the identities of peers that endorsed the transaction $tx_i$ and the signature on $tx_i$ was verified. Finally, for each transaction $tx_i$ in block B, perform the usual validation (endorsement policy, MVCC checks, etc.) without verifying the signatures, and consider endorsers($tx_i$) as the signatures on $tx_i$.

FIG. 1B illustrates another diagram of a signature verification management configuration, according to example embodiments. Referring to FIG. 1B, the configuration 150 provides the transactions in block (B) that are endorsed by peer $E_j$. The payload 112 provided has hashes (H) of certain previous transactions along with signatures 114 of the transactions. The computing/verification node may identify the transactions/entries destined for the current block based on a first iteration of signature verification for which identified a same endorser $E_j$ among the endorsers 124 for three transactions/entries 122. In this example, $T_{x4}$ did not end up in the block. In summary, a single verification effort led to three endorsers being identified for three entries ($T_{x2}$, $T_{x3}$ and $T_{x5}$).

FIG. 1C illustrates another diagram of a signature verification management configuration 160 where a reduced number of endorsement verifications are performed to verify a larger number of entries, according to example embodiments. Referring to FIG. 1C, during a second iteration or second verification effort, the endorsers of $T_{x0}$ and $T_{x1}$ were also identified during a single verification of the signature information of a single submitted set of signatures.

FIG. 1D illustrates another diagram of a signature verification management configuration where a reduced number of endorsement verifications are performed to verify a larger number of entries, according to example embodiments. Referring to FIG. 1D, the result 170 demonstrates that two verifications led to the signature verification of all five transactions which saves time and computing resources, such as memory, CPU cycles.

Figure 2A:
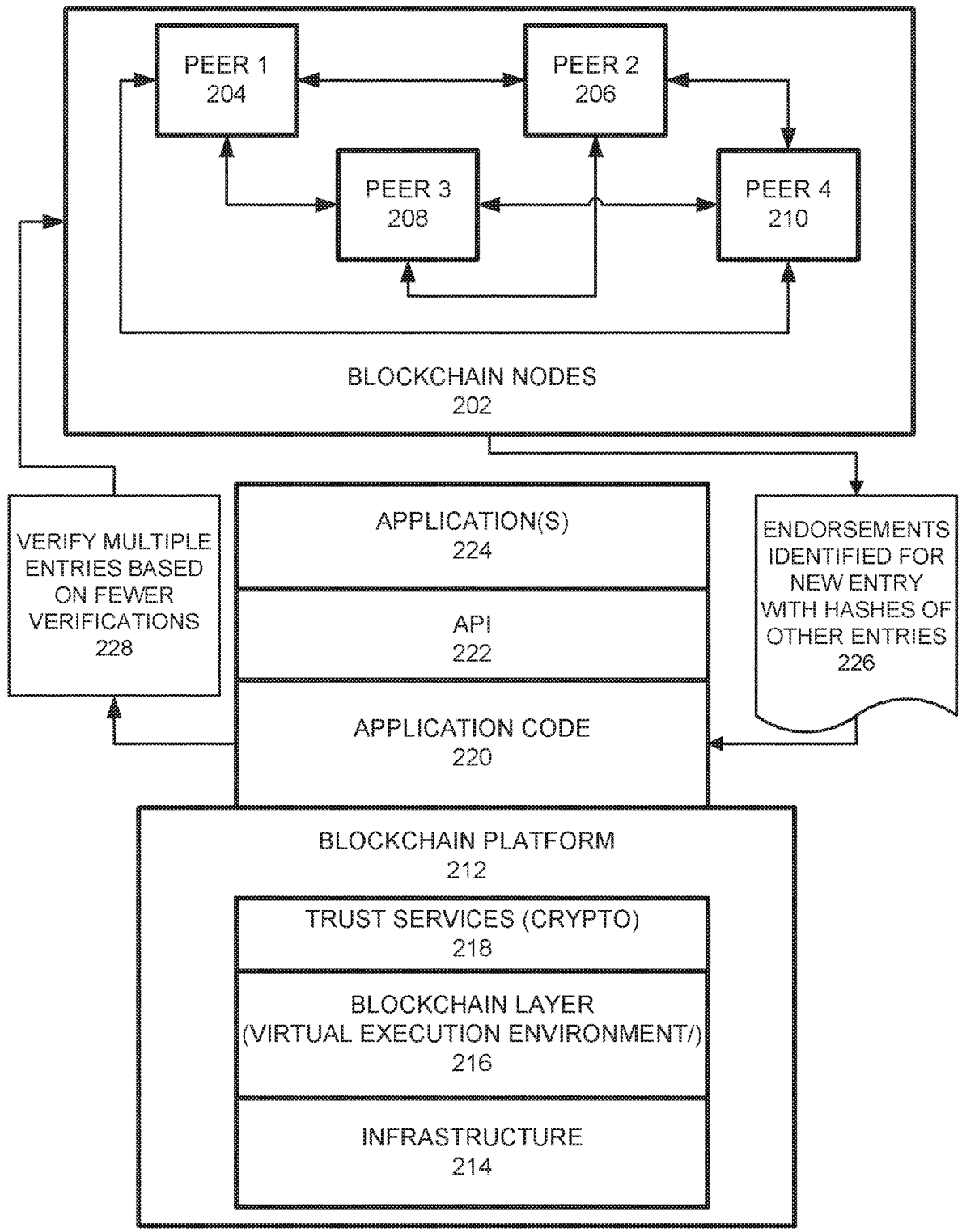
FIG. 2A illustrates an example peer node configuration with a reduced number of signature verification actions being performed, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain entry addition and validation process (consensus). One or more of the blockchain nodes 204-210 may endorse entries based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., smart contracts, etc.) which can be created according to a customized configuration sought by participants and can maintain their own state, control their own assets, and receive external information. This can be deployed as an entry and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new entries and provide access to auditors which are seeking to access data entries. The blockchain layer 216 may expose an interface that provides access to the virtual execution environment necessary to process the program code and engage the physical infrastructure 214. Cryptographic trust services 218 may be used to verify entries such as asset exchange entries and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include signatures for a new entry including hashes of previous entries 226. The process may then perform a reduced set of verifications of previously endorsed transactions/entries while verifying a current endorsement entry 228. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

Figure 2B:
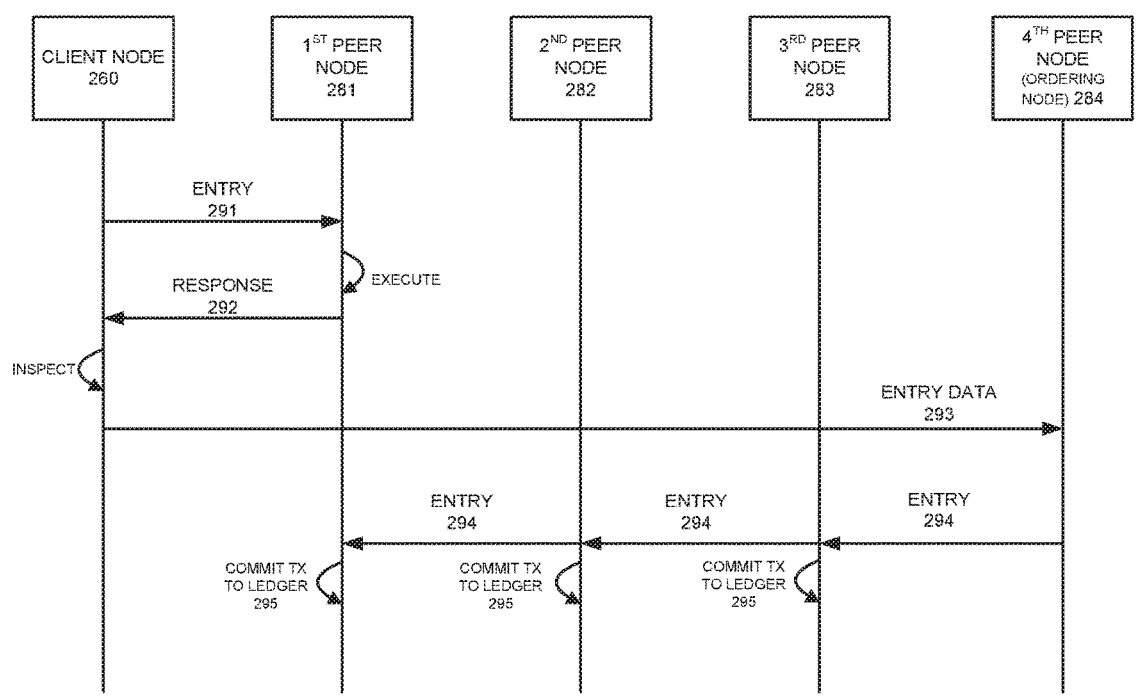
FIG. 2B illustrates a further peer node configuration, according to example embodiments.

FIG. 2B illustrates an example of a flow 250 between nodes of the blockchain in accordance with an example embodiment. Referring to FIG. 2B, the entry flow may include an entry proposal 291 sent by an application client node 260 to an endorsing peer node 281. The endorsing peer 281 may verify the client signature and execute a smart contract function to initiate the entry. The output may include the smart contract execution results, a set of key/value versions that were read in the smart contract (read set), and the set of keys/values that were written in a smart contract (write set). The proposal response 292 is sent back to the client 260 along with an endorsement signature, if approved. The client 260 assembles the signatures into an entry payload 293 and broadcasts it to an ordering service node 284. The ordering service node 284 then delivers ordered entries as blocks to all peers 281-283. Before commit to the blockchain, each peer 281-283 may validate the entry. For example, the peers may check a policy defined in the blockchain to ensure that the correct allotment of the specified peers have signed the results and authenticated the signatures against the entry payload 293.

Referring again to FIG. 2B, the client node 260 initiates the entry (smart contract proposal) 291 by constructing and sending a request to the peer node 281, which is an endorser. The proposal is a request to invoke a smart contract function so that data can be read and/or written to the ledger (i.e., write new key value pairs for the assets).

In response, the endorsing peer node 281 may verify (a) that the entry proposal is well formed, (b) the entry has not been submitted already in the past (replay-attack protection), (c) the signature is valid, and (d) that the submitter (client 260, in the example) is properly authorized to perform the proposed operation. The endorsing peer node 281 may take the entry proposal inputs as arguments to the invoked smart contract function. The smart contract is then executed against a current state database to produce entry results including a response value, read set, and write set. However, no updates are made to the ledger at this point. In 292, the set of values, along with the endorsing peer node's 281 signature is passed back as a proposal response 292 to the client 260 which parses the payload for the application to consume.

In response, the application of the client 260 inspects/verifies the endorsing peers' signatures and compares the proposal responses to determine if the proposal response is the same. If the smart contract only queried the ledger, the application would inspect the query response and would typically not submit the entry to the ordering node service 284. If the client application intends to submit the entry to the ordering node service 284 to update the ledger, the application determines if the specified endorsement policy has been fulfilled before submitting (i.e., did all peer nodes necessary for the entry endorse the entry). Here, the client may include only one of multiple parties to the entry. In this case, each client may have their own endorsing node, and each endorsing node will need to endorse the entry. The architecture is such that even if an application selects not to inspect responses or otherwise forwards an unendorsed entry, the endorsement policy will still be enforced by peers and upheld at the commit validation phase.

After successful inspection, in step 293 the client 260 assembles signatures into an entry and broadcasts the entry proposal and response within an entry message to the ordering node 284. The entry may contain the read/write sets, and the endorsing peers' signatures. The ordering node 284 does not need to inspect the entire content of an entry in order to perform its operation, instead the ordering node 284 may simply receive transactions and batch them into blocks.

The blocks of the transactions are delivered from the ordering node 284 to all peer nodes 281-283 eligible to receive them. The transactions 294 within the block are validated to ensure all policies are fulfilled and to ensure that there have been no changes to ledger state for read set variables since the read set was generated by the entry execution. Transactions in the block are tagged as being valid or invalid. Furthermore, in step 295 each peer node 281-283 appends the block to the blockchain, and for each valid transaction the write sets are committed to the state database.

Figure 3:
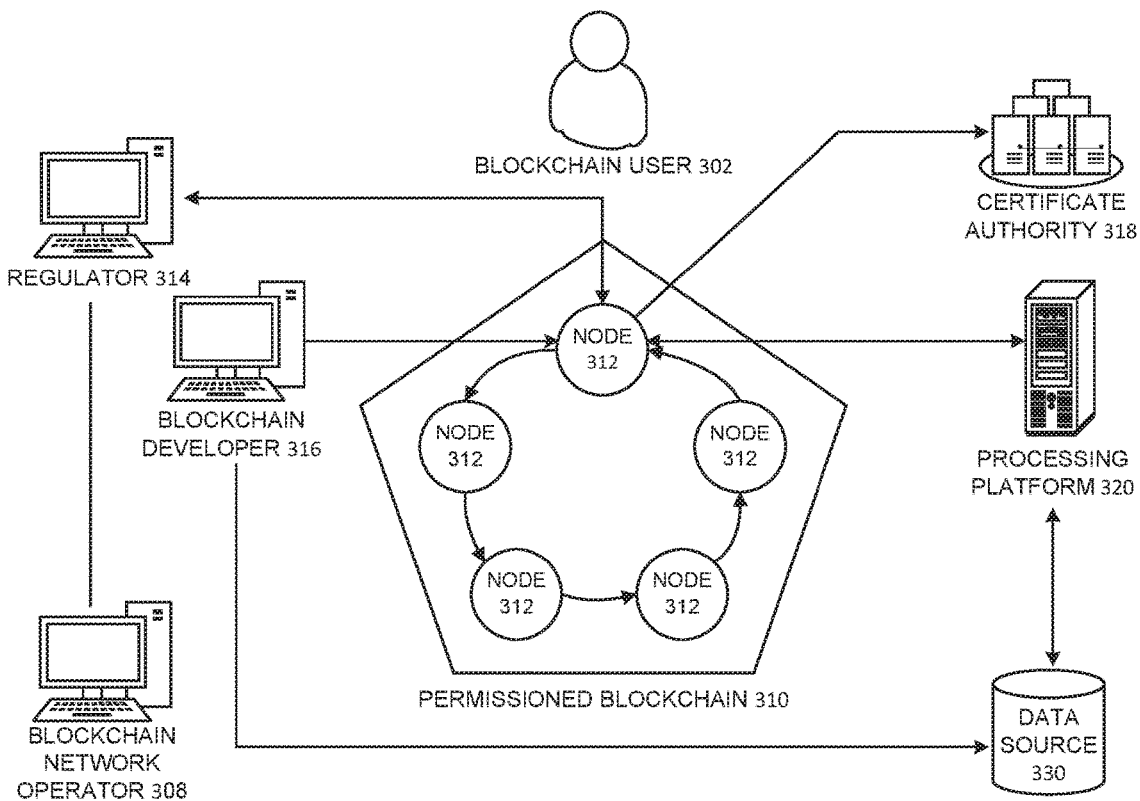
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit an entry to the permissioned blockchain network 310. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to invoke smart contracts and transact on the blockchain.

A blockchain developer system 316 writes smart contracts and client-side applications. To include credentials from a traditional data source 330 in smart contracts, the developer system 316 could use an out-of-band connection to access the data. In this example, the blockchain user 302 connects to the network through a peer node 312. Before proceeding with any entries, the peer node 312 retrieves the user's enrollment and entry certificates from the certificate authority 318. In some cases, blockchain users must possess these digital certificates in order to transact on the permissioned blockchain network 310.

Figure 4:
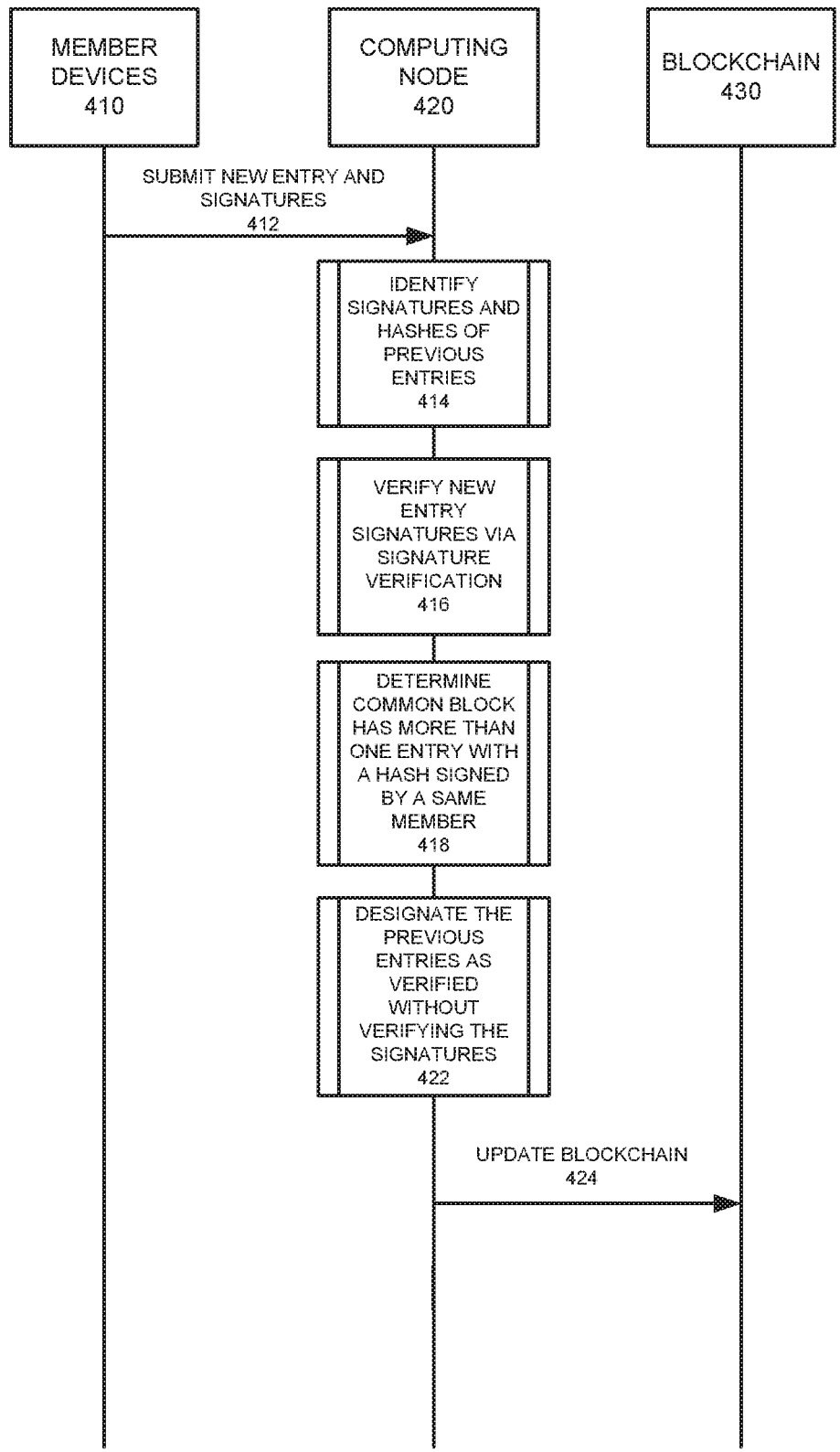
FIG. 4 illustrates a system messaging diagram of a signature verification management configuration, according to example embodiments.

FIG. 4 illustrates a system messaging diagram for performing membership management in a database, according to example embodiments. Referring to FIG. 4, the system diagram 400 includes certain member devices 410 providing endorsement/signatures and related information for new and uncommitted entries to a blockchain 430. The computing node 420 is setup to receive the information 412 and identify the signatures and hashes of other signatures 414. The verification of endorsed/signed digital signatures can be performed in fewer cycles when the hash information clearly identifies the endorsers of the entries in the common block 416. The common block may have more than one entry with a hash signed by a same member 418 and thus the verification of various entries is deemed valid 422 even though certain entries were not actually signature verified, although certain other entries were signature verified. The blockchain can then commit the entries in the current block 424.

Figure 5A:
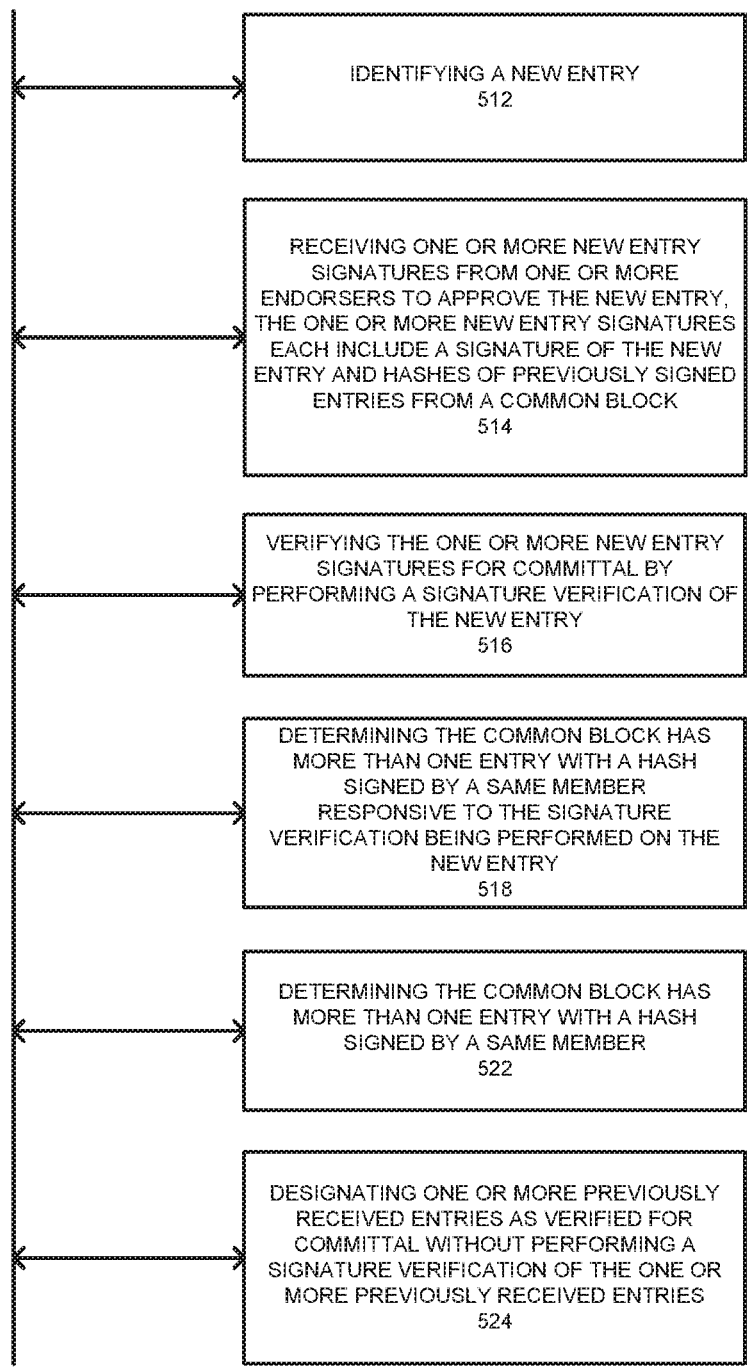
FIG. 5A illustrates a flow diagram of a signature verification management configuration, according to example embodiments.

FIG. 5A illustrates a flow diagram 500 of an example method of fraud management in a blockchain, according to example embodiments. Referring to FIG. 5A, the method 500 may include identifying a new entry to a blockchain 512, receiving one or more new entry signatures to approve the new entry to the blockchain, such that the one or more new entry signatures each include an endorsement of the new entry and hashes of previously endorsed entries for a common block 514, verifying the one or more new entry signatures for commit to the blockchain by performing a signature verification of the new entry 516, determining the common block has more than one entry with a hash signed by a same blockchain member 518, responsive to the signature check being performed on the new entry, and determining the common block has more than one entry with a hash signed by a same blockchain member 522, and also designating one or more previously received entries as verified for commit to the blockchain without performing a signature verification of the one or more previously received entries 524. In other words, a verification is performed on fewer entries than those deemed verified and submitted for commit to the ordering node of the completed blockchain block.

The hashes of the previously endorsed entries for the common block are included in a payload portion of the endorsement of the new entry. The method may also include forwarding the new entry to one or more endorser peers assigned to the blockchain, and the endorser peers each have local cache memories to store the hashes of the previously endorsed entries for the common block. The local cache memories are erased when the common block is completed and a new block is initiated. The method may also include forwarding the new entry signatures from the endorser peers with the hashes of the previously endorsed entries, and verifying the one or more new entry signatures for commit to the blockchain by performing the signature verification of the new entry, comprises performing multiple iterations of verifying (MIV), wherein MIV<a total number of verified entries (VE).

Figure 5B:
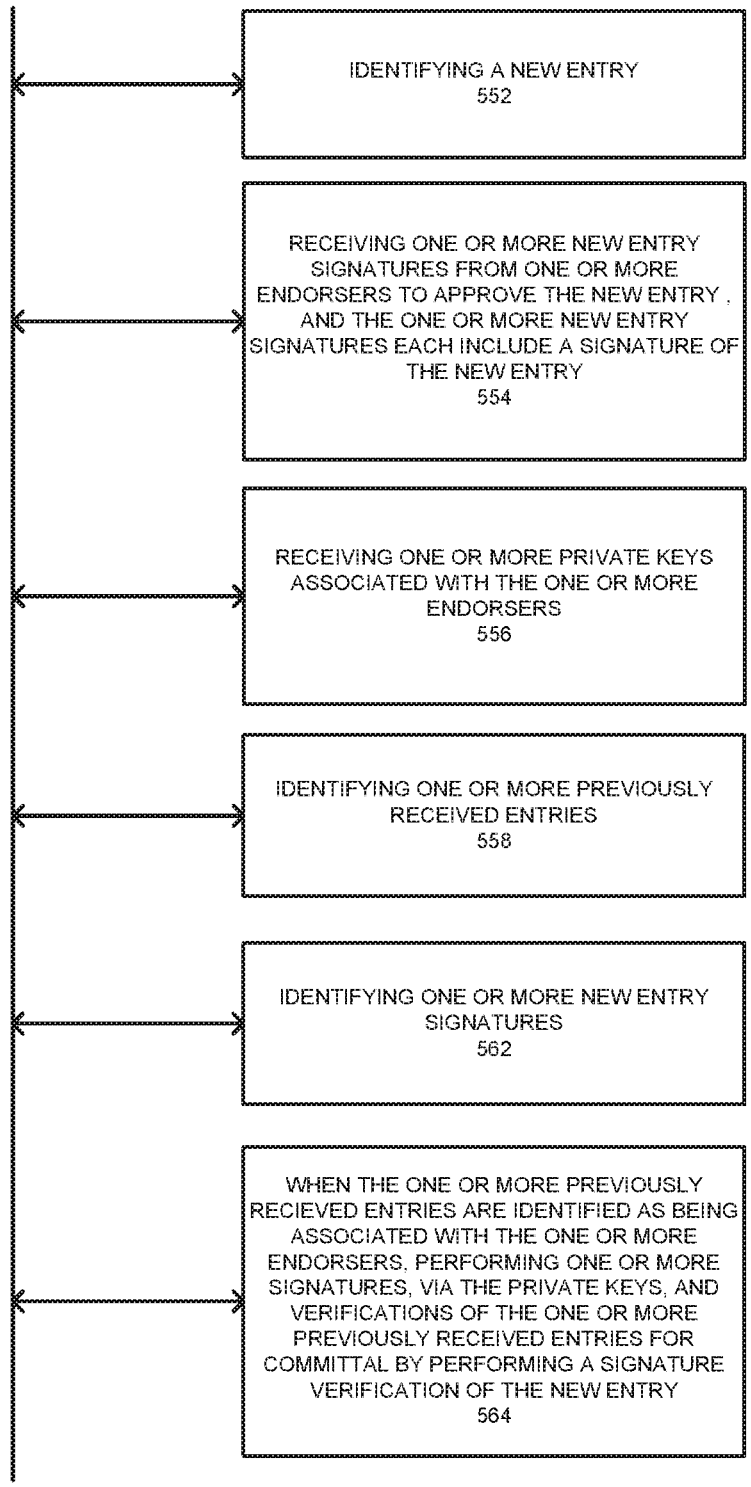
FIG. 5B illustrates a further flow diagram of a signature verification management configuration, according to example embodiments.

FIG. 5B illustrates a flow diagram 550 of another example method of signature management and entry commit, according to example embodiments. The method may include identifying a new entry 552, receiving one or more new entry signatures from one or more endorsers to approve the new entry, where the one or more new entry signatures each include an endorsement of the new entry 554, receiving one or more private keys associated with the one or more endorsers 556, identifying one or more previously received entries 558, verifying the one or more new entry signatures 562, and when the one or more previously received entries are identified as being associated with the one or more signatures, performing one or more signatures and verifications of the one or more previously received entries for commit by performing a signature verification of the new entry via the one or more private keys 564.

Figure 6A:
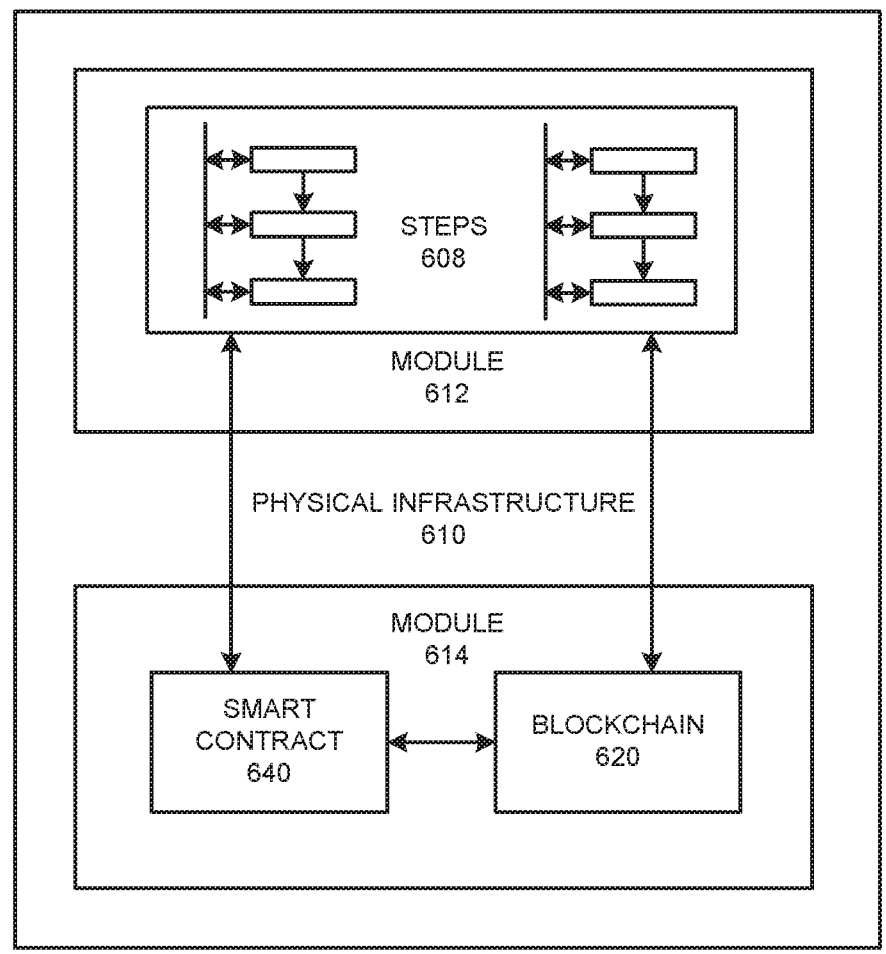
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
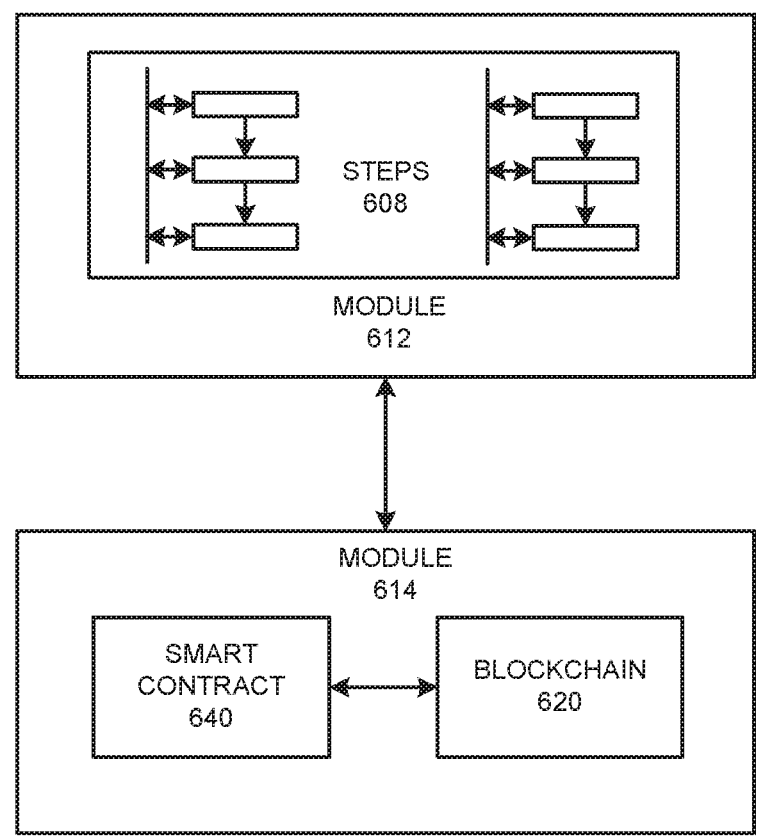
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
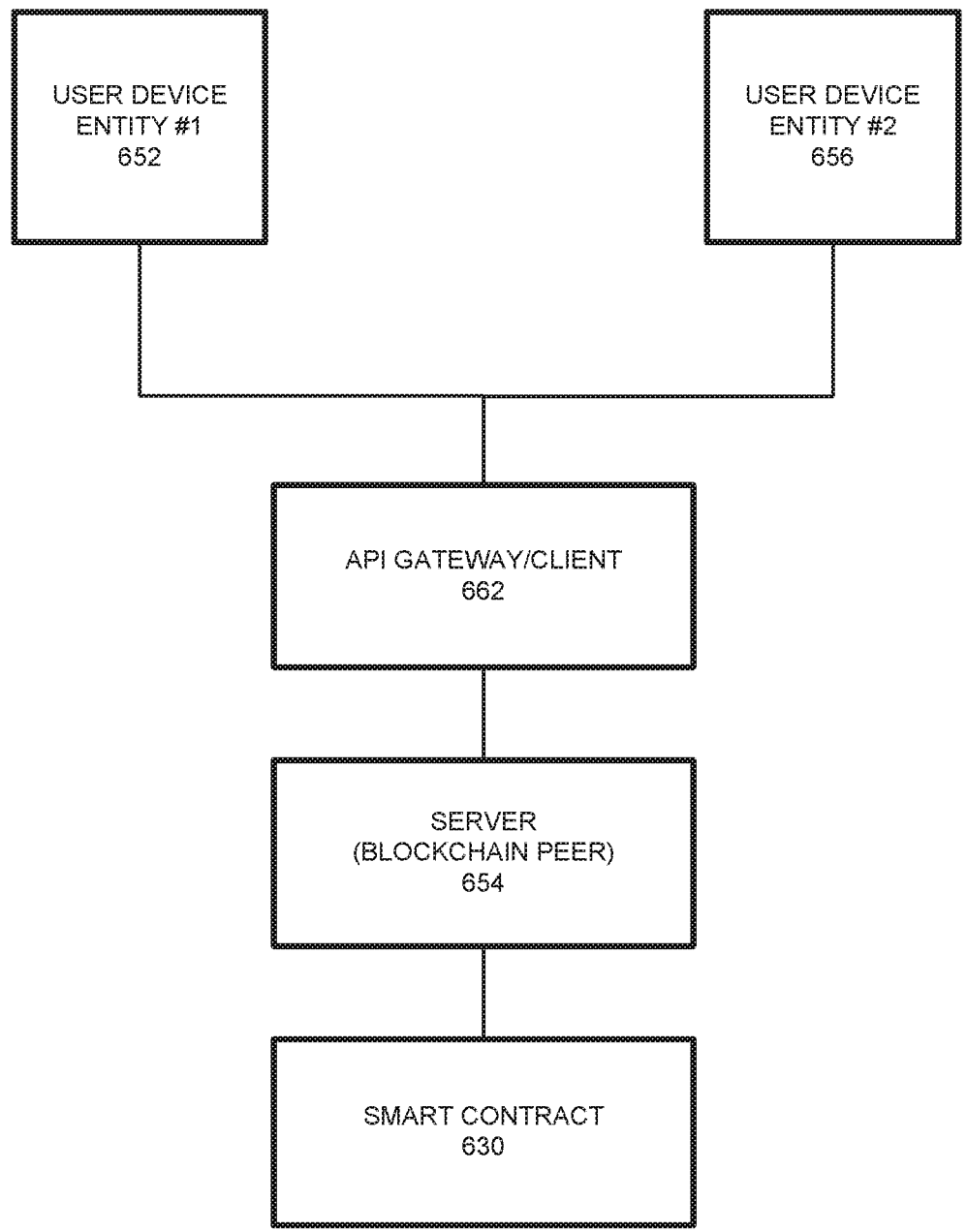
FIG. 6C illustrates another an additional example system, according to example embodiments.

FIG. 6C illustrates a common interface 660 for accessing logic and data of a blockchain, according to example embodiments. Referring to the example of FIG. 6C, an application programming interface (API) gateway 662 provides a common interface for accessing blockchain logic (e.g., smart contract 630) and data (e.g., distributed ledger, etc.) In this example, the API gateway 662 is a common interface for performing entries on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit entries into the blockchain network where, depending on the smart contract 630 and policies, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7A:
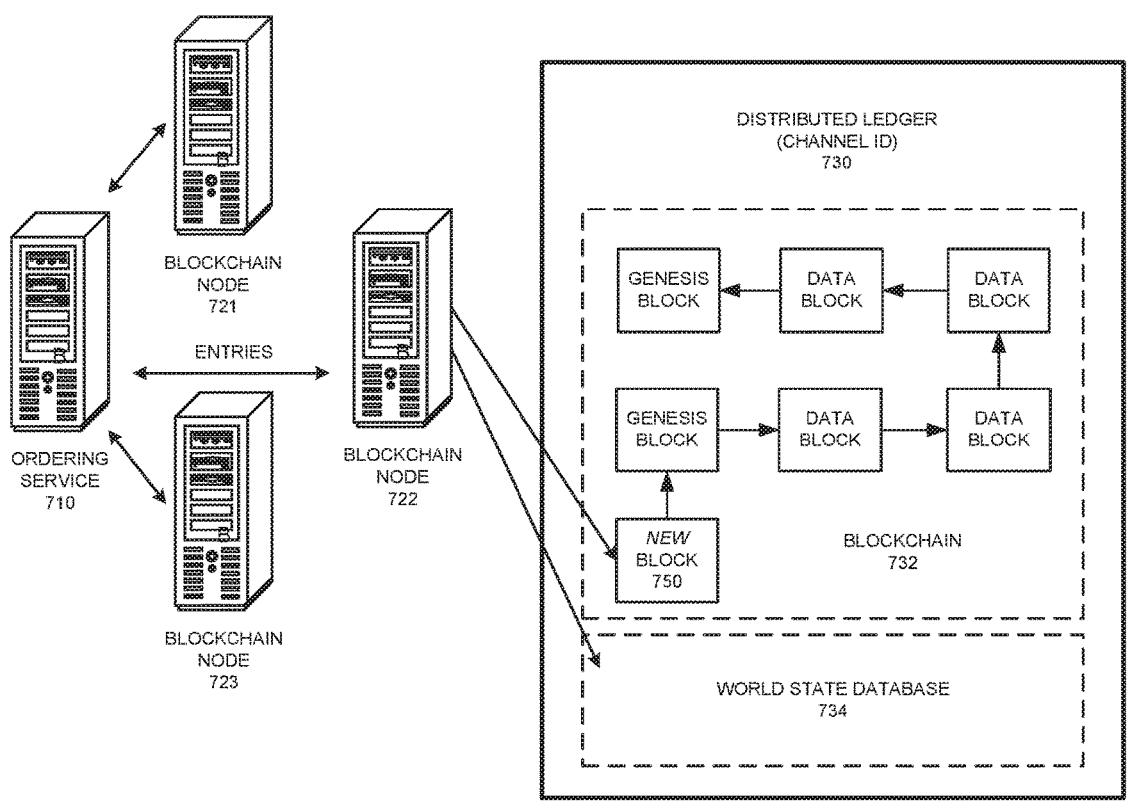
FIG. 7A illustrates a process of new data being added to a database, according to example embodiments.
Figure 7B:
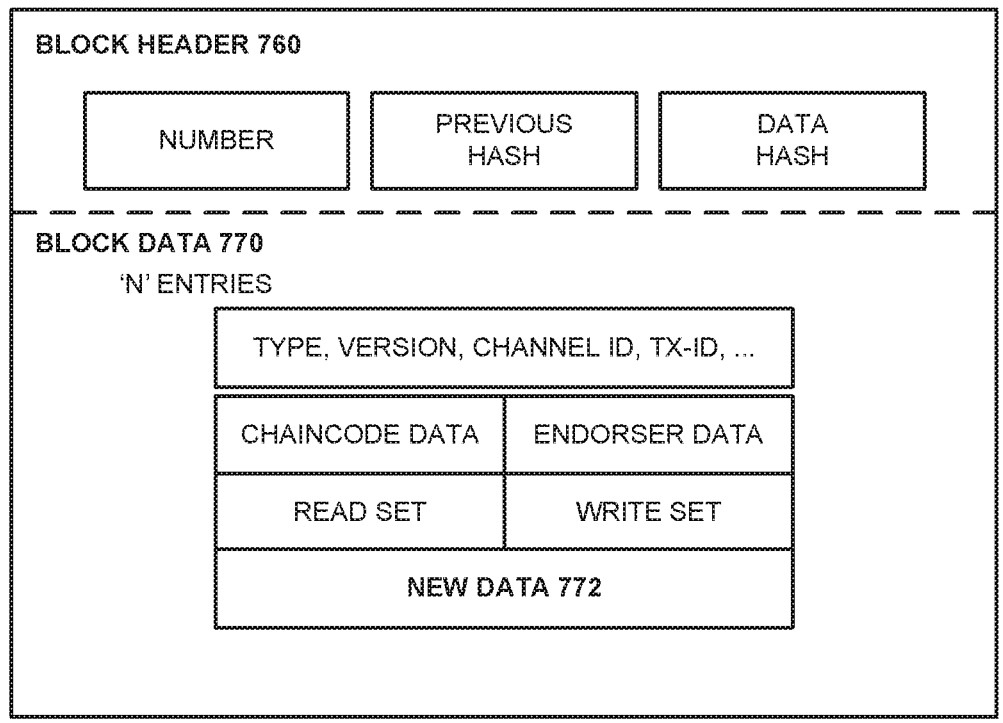
FIG. 7B illustrates contents of a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit entries to blockchain nodes 721, 722, and/or 723. Clients may be instructions received from any source to enact activity on the blockchain 730. As an example, clients may be applications that act on behalf of a requester, such as a device, person or entity to propose entries for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse entries proposed by clients and committing peers which verify signatures, validate entries, and commit entries to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. The blockchain 732 is an entry log, structured as hash-linked blocks where each block contains a sequence of N entries. Blocks may include various components such as shown in FIG. 7B. The linking of the blocks (shown by arrows in FIG. 7A) may be generated by adding a hash of a prior block's header within a block header of a current block. In this way, all entries on the blockchain 732 are sequenced and cryptographically linked together preventing tampering with blockchain data without breaking the hash links. Furthermore, because of the links, the latest block in the blockchain 732 represents every entry that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain entry log of the blockchain 732. Smart contract invocations execute entries against the current state in the state database 734. To make these interactions extremely efficient, the latest values of all keys are stored in the state database 734. The state database 734 may include an indexed view into the entry log of the blockchain 732, it can therefore be regenerated from the chain at any time. The state database 734 may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry.

In one specific example, a client sends a transaction to be executed via a smart contract, a peer member attests (endorses) execution of the result by providing their signature over the execution results. The client retrieves required signatures to satisfy the underlying endorsement policy. The transaction enters the ordering phase where a consensus protocol is used to produce an ordered sequence of endorsed entries grouped into blocks. Once a block is delivered to the rest of the network peers, each of the peers validates a transaction/entry to ensure it satisfies an endorsement/signature policy (i.e., signature verification). After a validation phase is completed, a correspond block may be 'chained' to the ledger and committed, where only a valid transaction takes actual effect on a world state of the blockchain.

The ordering service 710 accepts endorsed entries, orders them into a block, and delivers the blocks to the committing peers. For example, the ordering service 710 may initiate a new block when a threshold of entries has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process entries, smart contracts, or maintain the shared ledger. Rather, the ordering service 710 may accept the endorsed entries and specifies the order in which those entries are committed to the distributed ledger 730.

Entries are written to the distributed ledger 730 in a consistent order. The order of entries is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network such as leader based consensus.

When the ordering service 710 initializes a new block 750, the new block 750 may be broadcast to committing peers (e.g., blockchain nodes 721, 722, and 723). In response, each committing peer validates the entry within the new block 750 by checking to make sure that the read set and the write set still match the current world state in the state database 734. Specifically, the committing peer can determine whether the read data that existed when the endorsers simulated the entry is identical to the current world state in the state database 734. When the committing peer validates the entry, the entry is written to the blockchain 732 on the distributed ledger 730, and the state database 734 is updated with the write data from the read-write set. If an entry fails, that is, if the committing peer finds that the read-write set does not match the current world state in the state database 734, the entry ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores entry data, however this is not a requirement. The block 750 may store transactional information of N entries (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store entry information of each entry that is recorded within the block 750. For example, the entry data may include one or more of a type of the entry, a version, a timestamp, an ID of the distributed ledger 730, an entry ID, an epoch, a smart contract, input, a client (creator), such as a public key and certificate, a signature of the client, identities of endorsers, endorser signatures, a proposal hash, response, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

Figure 8:
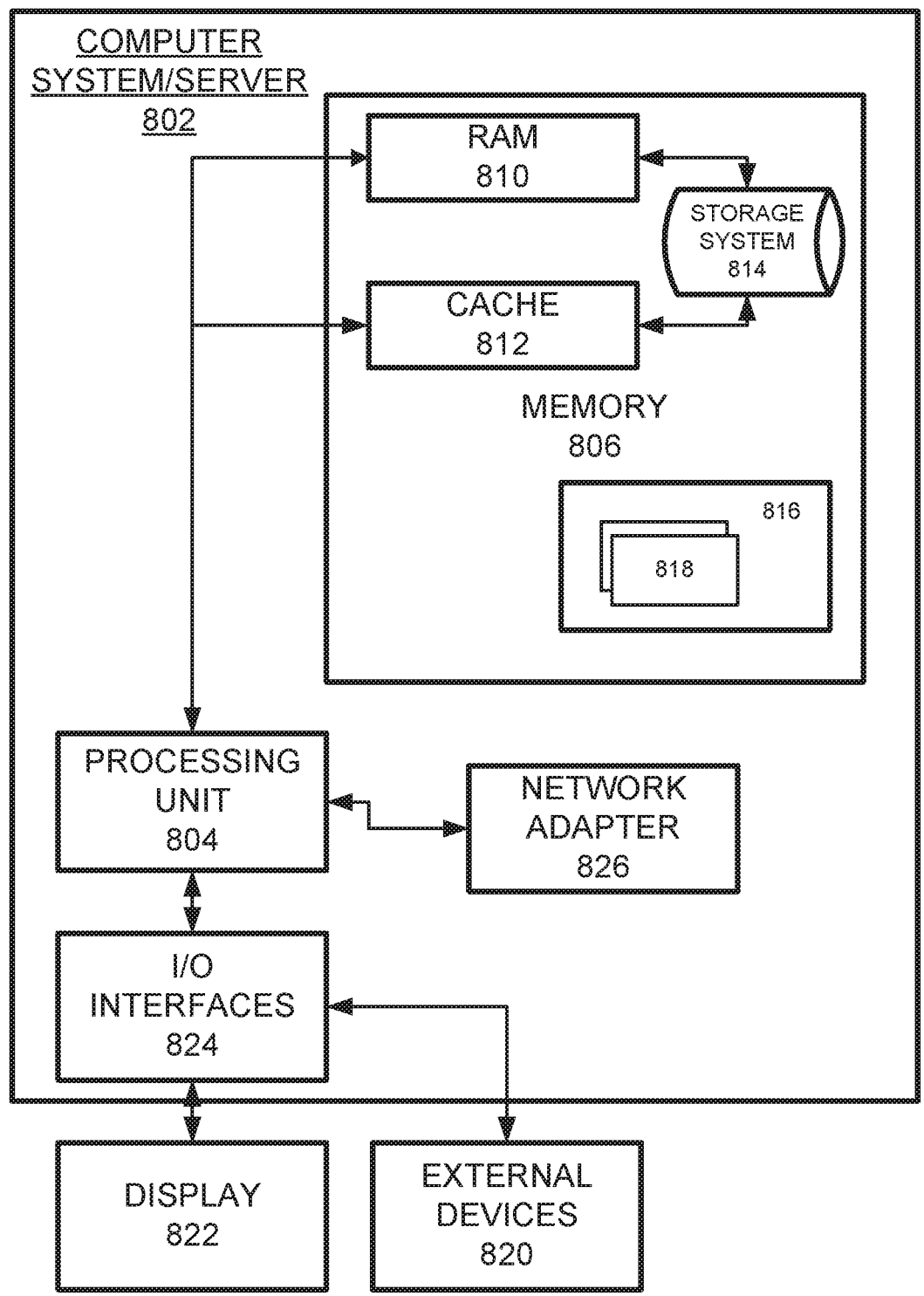
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
   a computing node in a network, the computing node configured to:
      identify a new entry for committal to a blockchain of the network;
      receive one or more new entry signatures to approve the new entry, wherein the one or more new entry signatures each comprise a signature of the new entry and hashes of previously signed entries for a common block of the blockchain, wherein the hashes of the previously signed entries are included in a payload portion of each of the one or more new entry signatures;
      verify the one or more new entry signatures for committal to the blockchain by a signature verification of the new entry;
      identify that the common block has more than one entry with a hash signed by a same member of the blockchain network; and
      responsive to the signature verification being performed on the new entry and the common block being identified as having more than one entry with a hash signed by a same member, designate one or more previously received entries as verified for committal to the blockchain without performing a signature verification on the one or more previously received entries.

2. The system of claim 1, wherein the computing node is further configured to: forward the new entry to one or more endorser peers in the network.

3. The system of claim 2, wherein the endorser peers each have local cache memories to store the hashes of the previously signed entries for the common block.

4. The system of claim 2, wherein the local cache memories are erased when the common block is completed and a new block is initiated.

5. The system of claim 1, wherein the computing node is further configured to: forward the new entry signatures from the endorser peers with the hashes of the previously signed entries.

6. The system of claim 1, wherein, when the computing node is to verify the one or more new entry signatures for committal, the computing node is further configured to: perform multiple iterations of verifying (MIV), wherein MIV<a total number of verified entries (VE).

7. A method, comprising:
   identifying, by a node in a blockchain network, a new entry for committal to blockchain of the blockchain network;
   receiving, by the node, one or more new entry signatures to approve the new entry, wherein the one or more new entry signatures each comprise a signature of the new entry and hashes of previously signed entries for a common block of the blockchain, wherein the hashes of the previously signed entries are included in a payload portion of each of the one or more new entry signatures;
   verifying, by the node, the one or more new entry signatures for committal to the blockchain by a signature verification of the new entry;
   identifying, by the node, that the common block has more than one entry with a hash signed by a same member; and
   responsive to the signature verification being performed on the new entry and determining the common block has more than one entry with a hash signed by a same member, designating, by the node, one or more previously received entries as verified for committal to the blockchain without performing a signature verification on the one or more previously received entries.

8. The method of claim 7, further comprising:
   forwarding the new entry to one or more endorser peers in the network.

9. The method of claim 8, wherein the endorser peers each have local cache memories to store the hashes of the previously signed entries for the common block.

10. The method of claim 8, further comprising:
erasing the local cache memories when the common block is completed and a new block is initiated.

11. The method of claim 7, further comprising:
forwarding the new entry signatures from the endorser peers with the hashes of the previously signed entries.

12. The method of claim 7, wherein the verifying the one or more new entry signatures for committal further comprises:
performing multiple iterations of verifying (MIV), wherein MIV<a total number of verified entries (VE).

13. A non-transitory computer readable storage medium storing one or more instructions that when read by a processor cause the processor to perform:
receiving one or more new entry signatures to approve the new entry, wherein the one or more new entry signatures each comprise a signature of the new entry and hashes of previously signed entries for a common block of the blockchain, wherein the hashes of the previously signed entries are included in a payload portion of each of the one or more new entry signatures;
verifying the one or more new entry signatures for committal to the blockchain by a signature verification of the new entry;
identifying that the common block has more than one entry with a hash signed by a same member; and
responsive to the signature verification being performed on the new entry and determining the common block has more than one entry with a hash signed by a same member, designating one or more previously received entries as verified for committal to the blockchain without performing a signature verification on the one or more previously received entries.

14. The non-transitory computer readable storage medium of claim 13, wherein the one or more instructions further cause the processor to perform:
forwarding the new entry to one or more endorser peers in the network.

15. The non-transitory computer readable storage medium of claim 14, wherein the endorser peers each have local cache memories to store the hashes of the previously signed entries for the common block.

16. The non-transitory computer readable storage medium of claim 14, wherein the local cache memories are erased when the common block is completed and a new block is initiated.

17. The non-transitory computer readable storage medium of claim 13, wherein, when the one or more instructions cause the processor to verify the one or more new entry signatures for committal, the one or more instructions further cause the processor to perform: multiple iterations of verifying (MIV), wherein MIV<a total number of verified entries (VE).

* * * * *